March 5, 1963  W. T. RENTSCHLER  3,079,848
PHOTOGRAPHIC CAMERA PROVIDED WITH AUTOMATIC
EXPOSURE SETTING MECHANISM
Filed June 20, 1961  2 Sheets-Sheet 1
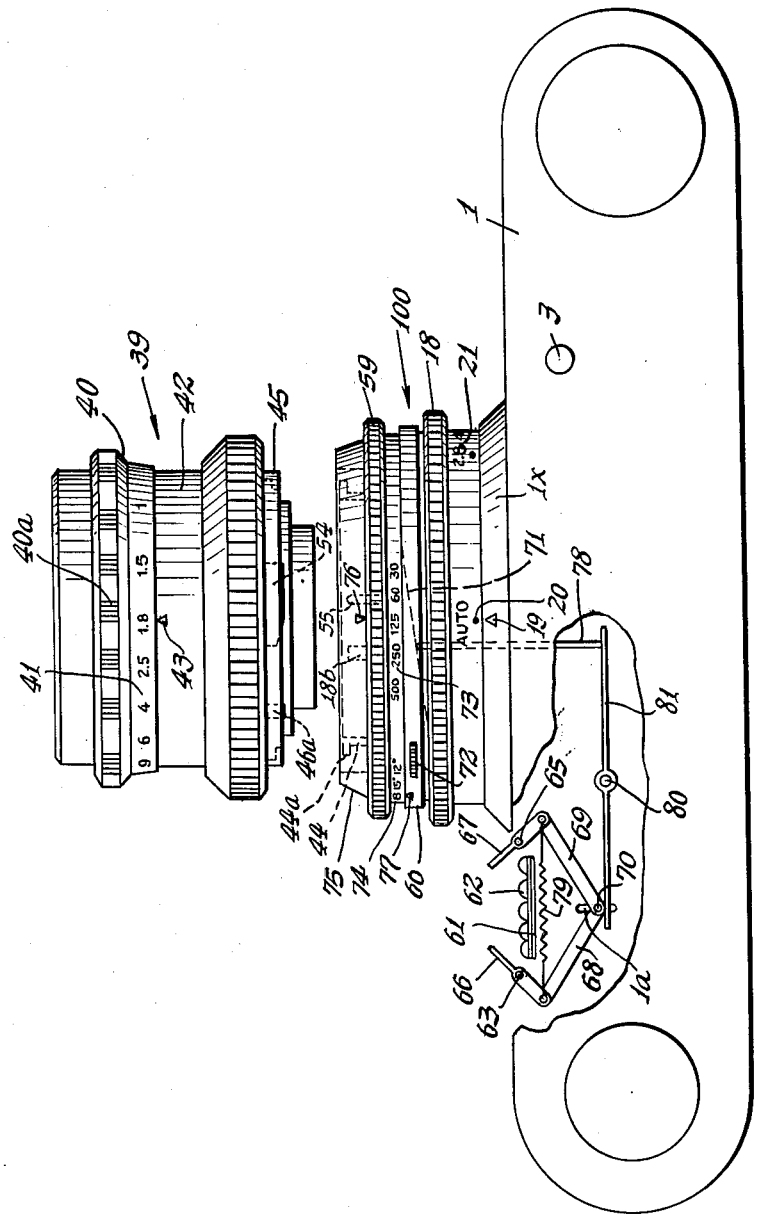
INVENTOR.
Waldemar T. Rentschler
BY
March and Curtiss
ATTORNEYS

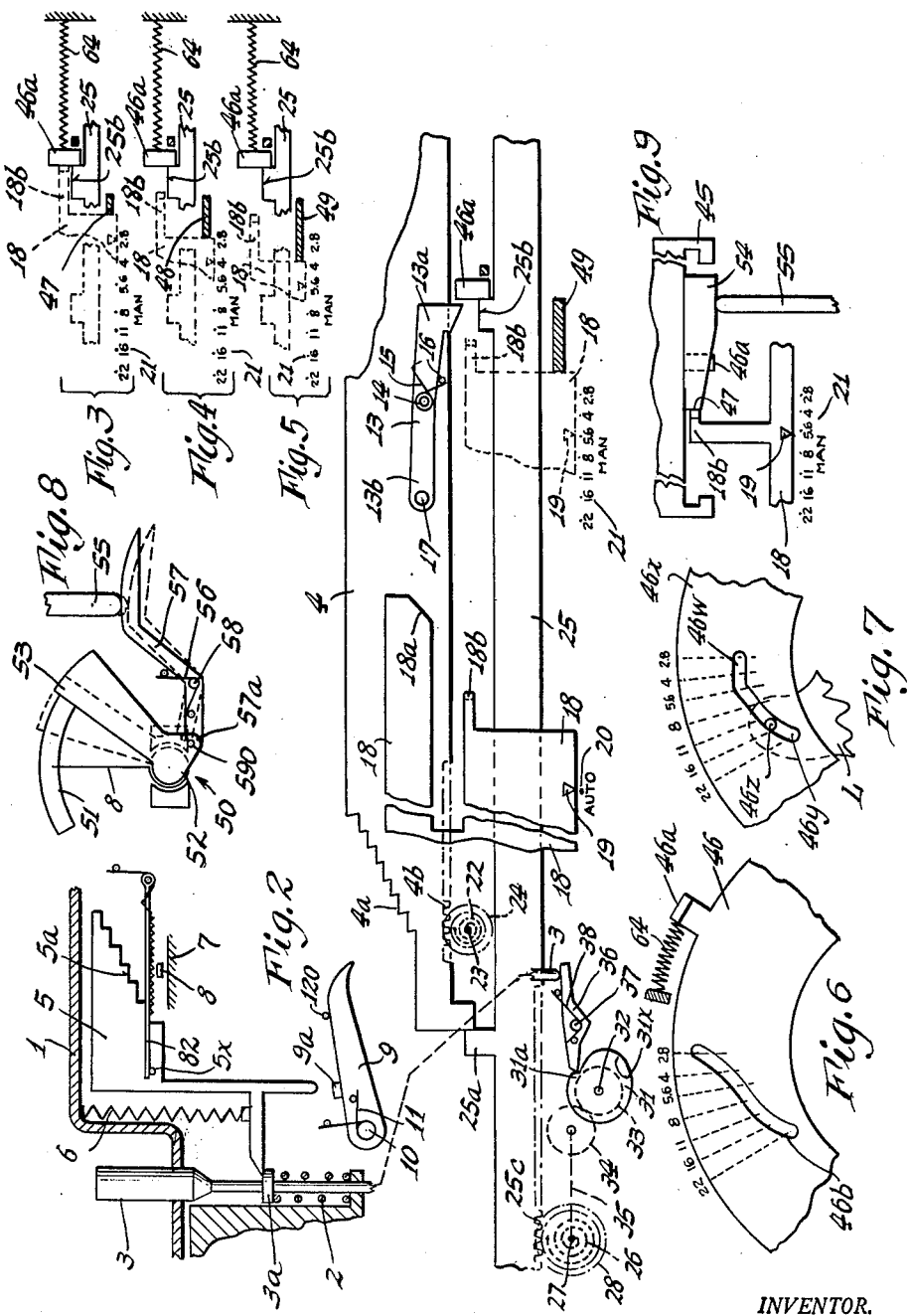

United States Patent Office 3,079,848
Patented Mar. 5, 1963

3,079,848
PHOTOGRAPHIC CAMERA PROVIDED WITH AUTOMATIC EXPOSURE SETTING MECHANISM
Waldemar T. Rentschler, Calmbach (Enz), Germany, assignor to Alfred Gauthier, G.m.b.H., Calmbach (Enz), Germany, a corporation of Germany
Filed June 20, 1961, Ser. No. 118,466
5 Claims. (Cl. 95—10)

This invention relates to photographic cameras which have automatic exposure setting or regulator mechanisms, and more particularly to cameras of this type wherein the diaphragm devices are carried by separate interchangeable lens assemblies which are removable from the camera casing.

The invention relates to improvements in the photographic camera described and claimed in my copending application Serial Number 100,730, filed April 4, 1961, now Patent No. 3,037,435, and entitled Photographic Camera Having Automatic Exposure Setting Means.

In this prior camera construction there is provided an automatic exposure setting mechanism comprising a manually operable selector or switch member which is positionable in "automatic" and "non-automatic" positions, which member in the illustrated embodiment is combined with a manually operable setting member adapted to be operative for the "non-automatic" setting of the selector, to manually regulate or adjust the diaphragm. In this prior construction, for the purpose of carrying out exposures utilizing the automatic exposure setting mechanism there is provided a control member which is adapted for connection with a light intensity measuring device so as to be adjustably positioned thereby, such control member further having a powered driving means. Associated with the control member is a cocking and release device having a movable cocking member on which there is movably mounted a stop, the latter being arranged for engagement with the diaphragm adjusting member to enable the latter under the action of suitable spring means to shift with or follow the control member. Also, in this prior construction, the movable stop on the control member is shiftable, in response to setting the selector in its "non-automatic" position, to a position which is out of the path of movement of the diaphragm adjusting member, this being for the purpose of rendering inoperative the action of the control member where non-automatic settings are to be effected. In addition, the selector member has a stop connected with the manual setting member which, upon the selector being placed in such "non-automatic" position is now engageable with the diaphragm adjusting member to effect a coupling therewith by which manual diaphragm adjustment is had. The prior arrangement also provides for both the control member and the diaphragm adjusting member being shifted, by means of the cocking and release device, into a starting position which is associated with the cocked state of the associated driving means, and such control and adjusting member are retained in the said starting position.

The photographic camera constructed in accordance with my copending application identified has the special advantage that, in order to render inoperative the control of the automatic exposure regulating mechanism where non-automatic exposures are desired, there is not required any special coupling means which would otherwise be considered necessary in the connection between the control member and the light intensity measuring device, nor any special actuating arrangement for releasing such coupling means. Accordingly, there is had an optimally uncomplicated, space and cost saving structure in the camera on the one hand, as well as freedom and flexibility of construction (as regards the components and mode of operation of the exposure regulating device) on the other hand. In addition, because of the uncomplicated structure, the camera in this prior copending application is characterized by a particularly high degree of functional dependability.

An object of the present invention is to provide improvements in the camera of the type identified and disclosed in my copending application while retaining the above-outlined advantages, whereby there is had an automatic setting of the diaphragm in an uncomplicated and cost-saving manner but now with a camera construction wherein the diaphragm device is carried by a separate lens assembly which can be removably mounted on the camera case or shutter case and which is interchangeable with other similar lens assemblies each of which have lenses of different speeds for example (i.e. the diaphragm devices having different ranges). Included in this object is an organization whereby the connection of the diaphragms with the setting devices therefor may be automatically effected without requiring special attention on the part of the operator, regardless of whether the control member is disposed in its cocked position or in its run-down position.

In accomplishing the foregoing, the invention provides a camera construction having an interchangeable lens assembly provided with a built-in settable diaphragm, such assembly further having a spring-urged setting or adjusting member which tends to keep the diaphragm in the position providing the smallest aperture. In the present organization, when an interchangeable lens assembly is mounted on the camera case, as by means of a suitable coupling member, the diaphragm adjusting member under the action of its spring cooperates by the use of a projecting actuator arm, either with the movable stop of the automatic setting mechanism or with the manual setting member, both of which are carried by the camera case. Further, the cocking and releasing device having the movable cocking member mounted on the camera case is arranged to have a path of movement which is attuned to or correlated with the setting range of the diaphragm adjusting member of the particular interchangeable lens assembly having the fastest lens; that is, the movement of the cocking member corresponds to the movement of the adjusting member which effects the greatest diaphragm range, found in that one of the interchangeable lens assemblies which has the greatest speed. Further, when a lens assembly of lesser speed is utilized and mounted on the camera case, the lesser distance of travel of the diaphragm adjusting member in traversing the whole diaphragm range is compensated and adapted to the greater path of movement of the cocking member by providing for an overtravel of the adjusting member, during which overtravel the diaphragm is maintained at the largest aperture or opening.

The invention thereby provides an improved device for effecting automatic settings of various diaphragms of a set of interchangeable lens assemblages which may be utilized with a particular camera case, the arrangement being particularly advantageous with respect to the mode of operation of the camera and with respect to the expenditure or cost required in the manufacture, as well as with respect to adaptability or range of usefulness. These advantages result especially from the fact that in a camera as constructed in accordance with the invention the coupling of the diaphragm of the interchangeable lens assembly with the cooperable setting devices carried by the camera case, and the taking into account of the respective speeds of the various interchangeable lens assemblies is effected completely automatically, without any attention being required on the part of the operator and independently of the respective working positions or conditions of the setting devices concerned. As a consequence, any one of the interchangeable lens assemblies can be mounted on the camera case, as provided by the invention, in an equally simple manner as is the case with well-known interchangeable lens cameras wherein there is not provided an automatic diaphragm setting mechanism. It is further pointed out that, in a camera constructed in accordance with the invention, no special demands or requirements are made on the particular structure of the interchangeable lens assemblies which are utilized, since the setting devices for the diaphragm are (in the usual manner) carried by the camera or shutter assemblage, while there is merely added a coupling member and a spring influencing the diaphragm adjusting member in the direction of the smallest diaphragm aperture, insofar as the interchangeable lens assemblies are concerned. When using lens assemblies of different speeds (different lens speeds) the adjusting path of movement of the manual setting member can be adapted to the respective setting range of the diaphragm adjusting member in a simple and functionally dependable manner by the provision of different, simple stops provided on the various lens assemblies, which stops are variously located as determined by the lens speeds. When a particular lens assembly is mounted or affixed to the camera, the stop carried thereby is located in the path of movement of the manual setting member and limits the movement of the same in accordance with that required to cover the entire diaphragm range of the particular lens assembly and to include the largest settable diaphragm aperture of such assembly.

Such an organization involves an additional path of movement for the diaphragm adjusting member, beyond the point required to attain the largest diaphragm aperture, when using the automatic setting mechanism.

The additional path of movement of the diaphragm adjusting member may be readily obtained in a cost-saving way by constituting the diaphragm in a well-known manner, in the form of lamellas or segments which are controlled by an annular diaphragm adjusting member, the lamellas being pivotally carried by fixed bearing axles or pins and being adjusted by means of a cam or control slot provided on the diaphragm adjusting ring. Further, the control slots or cams are provided with portions arranged to be concentric with the axis of rotation of the adjusting ring, whereby when the actuating pin or cam follower means is on such concentric portion the diaphragm remains set at the largest aperture.

For the purpose of indicating whether or not a desired exposure setting is within the operating range of the camera when considering the prevailing light intensity and the speed of the lens assembly, there is further provided a known indicating and warning device which cooperates with the light intensity measuring device of the automatic exposure setting mechanism and which is preferably visible in the range finder, such indicator and warning device being shiftable as regards its relative setting with respect to the light intensity measuring device, by means of a control device provided on the lens assembly. The shifting or adjustment of the indicating and warning device occurs automatically in response to mounting or affixing each interchangeable lens assembly on the camera case. This arrangement insures an optimal operational simplicity and dependability, as regards the success of the exposure or photograph.

A further advantageous construction in the camera as provided by the invention which results in fewer components being required, is had by making the stop on the interchangeable lens assembly which is provided for the manual setting member so that it also constitutes the control device for the indicating and warning device. That is, the control device and the stop for the manual setting member are constituted as a single piece or part. Preferably, such stop or piece has one surface acting circumferentially for engagement with the manual setting member, and another surface acting axially for actuating the indicating and warning device.

An embodiment of the invention is shown in the accompanying drawings, in which:

FIG. 1 is an exploded top plan view of a camera construction employing an interchangeable lens assembly as provided by the invention, there being also an intra-lens shutter and the lens assembly including a built-in diaphragm provided in front of the shutter blades. The camera includes devices for both automatically and non-automatically setting or adjusting the diaphragm, such devices being rendered operative by placing a selector member in either an automatic position labelled "Auto" or else a manual or non-automatic position labelled "Man." For the purpose of taking into account the exposure time which is set on the shutter as well as the sensitivity of the film which is being used during the automatic diaphragm setting, a shading device for the photo-electric cell is carried by the camera case and is adjustable in response to movement of the setting devices for exposure time and film sensitivity. The camera case is broken away to reveal details of the shading device.

FIG. 2 is a diagrammatic representation of the setting device mechanisms for the automatic and non-automatic setting of the diaphragm, and of a cocking and releasing device for the diaphragm and the control member associated therewith.

FIG. 3 is a diagrammatic representation of the diaphragm adjusting member and the stops associated therewith, provided both on an interchangeable lens assembly and the camera case. Shown also is a stop or limit which limits the adjusting movement of the manual diaphragm setting member. There is further illustrated the cooperation of the removable cocking member with a coupling arm of the diaphragm adjusting member. The lens assembly in FIG. 3 is one having a fast lens, wherein the diaphragm aperture may be opened to the largest value of 2.8.

FIG. 4 is a diagrammatic illustration similar to that of FIG. 3, but representing a lens assembly of lesser speed, wherein the maximum diaphragm aperture is given as 4.0.

FIG. 5 is a diagrammatic representation similar to that of FIGS. 3 and 4, but representing an interchangeable lens assembly of still lesser speed, wherein the maximum diaphragm aperture is shown as 5.6.

FIG. 6 is a fragmentary elevational view of the diaphragm adjusting ring provided in the fastest interchangeable lens assembly, there being shown the control or cam slot provided in the ring for effecting adjustment of the diaphragm lamellas. The arrangement is that found in a lens assembly wherein a maximum diaphragm aperture of 2.8 is obtainable.

FIG. 7 is a view somewhat like that of FIG. 6, but showing a diaphragm adjusting ring as found in a lens assembly wherein the maximum diaphragm aperture value is 5.6.

FIG. 8 is a diagrammatic view of an indicating device which is cooperable with a light intensity measuring device and which can be automatically shifted as regards its position with respect to such measuring device, by means of control devices arranged on the interchangeable lens assemblies, such shifting being affected in response to the mounting or affixing of an interchangeable lens assembly on the camera case.

FIG. 9 is a diagrammatic representation of a stop member provided on the interchangeable lens assembly, which member serves not only for engagement with the manually operable setting member of the camera case but also constitutes the control device provided for cooperation with the indicating mechanism.

Those members or components in the various figures which are equivalent to members shown in my copending application above identified have been given the same reference numerals.

Referring now to FIGS. 1 and 2, the housing or case of the photographic camera is indicated by the numeral 1, as in applicant's copending application. Affixed on the case 1 in a well-known manner is a photographic intra-lens shutter assembly 100. For the purpose of releasing or opening the shutter to effect an exposure a release member or plunger 3 is movably mounted on the case 1, such plunger being shiftable in a direction perpendicular to the axis of the camera against the action of a spring 2. In order to effect an automatic exposure setting, a sensing member 5 is provided in the casing 1, cooperating with a control member 4, the sensing member senses the position of the movable part or pointer 8 of an electric exposure meter measuring device 50 which is built into the camera case 1, such action occurring in response to actuation or depression of the camera release plunger 3 in a well-known manner.

The sensing member 5 is movable in a direction parallel to the direction of movement of the plunger 3 and is biased downward, as seen in FIG. 2, by a compression coil spring 6 which tends to maintain the member in engagement with the collar 3a provided on the release member or plunger 3. The spring 6 is weaker than and overcome by the coil spring 2, as will be understood. For cooperation with the movable part or the measuring mechanism 50, the sensing member has a stepped edge 5a which engages, upon depressing movement of the release plunger 3 and under the action of the spring 6, the said movable needle 8 of the mechanism 50, such needle being backed-up by a fixed support 7. Prior to such engagement, the needle 8 is first clamped against the support 7 by a spring-biased clamping lever 82 which is under the control of a pin 5x provided on the sensing member 5.

A lever 9 serves to connect the sensing member 5 to the control member 4 (FIG. 2). The lever 9 is positioned about a fixed axis 10 provided in the camera case 1 or on the intra-lens shutter 100, and when such lever is not being acted upon by the sensing member 5 it is held in the position shown against a fixed pin 120 by a biasing spring 11 which biases the lever counterclockwise. The lever 9 has a tab or lug 9a disposed in the path of movement of the sensing member 5 as will be apparent.

The control member 4 is provided with a stepped edge 4a the individual steps of which are correlated with different exposure values occurring within the operating range of the camera. The lever 9 cooperates with the stepped edge 4a in such a manner that when the right-to-left setting movement of the control member 4 occurs under the action of a driving device to be described in detail below, one of the steps 4a impinges on the tip of the lever 9, thereby halting the control member 4 and preventing further right-to-left movement.

The control member 4 serves to effect the automatic positioning of a diaphragm adjusting member 46 which is to be described in detail below (see FIG. 6). The diaphragm adjusting member 46 is biased by a spring 64 (FIGS. 3–6) which tends to effect a clockwise rotation as seen in FIG. 6 so as to adjust the diaphragm to the smallest aperture value. In FIGS. 3–5 the spring 64 is shown diagrammatically as tending to effect a left-to-right shifting of the follower arm 46a of the diaphragm adjusting ring 46, also for the purpose of effecting the smallest diaphragm aperture. The shifting of the diaphragm adjusting member 46 occurs by the spring 64 in response to actuation or depressing movement of the camera release plunger 3. The extent of movement of the diaphragm adjusting ring 46 is limited by a stop 13 (to be described in detail below) which is movably mounted on the control member 4.

In order to be able to selectively effect either exposures involving the automatic setting mechanism or else non-automatic exposures wherein manual adjustment of the diaphragm is had, the camera construction further comprises a manually operable switch or selector member 18 which is positionable in "automatic" and "non-automatic" positions, and which serves at the same time as a means for manually operating the diaphragm adjusting member 46 (where exposures are to be made without use or benefit of the automatic exposure setting mechanism). There is also provided a cocking and releasing device including a movable cocking member 25, by means of which the control member 4 and the diaphragm adjusting member 46 can be shifted into the cocked or starting position shown in FIG. 2 and whereby they are retained in such positions.

For the purpose of rendering inoperative the control effected by the member 4 where non-automatic exposures are to be made the stop 13 which cooperates with the exposure setting or diaphragm setting member 46 is movably mounted on the control member 4 so that it can be shifted out of the path of movement of the setting or adjusting member 46 in response to the selector 18 being placed in the "non-automatic" position. For such condition, another stop 18b which is carried by the selector and adjusting member 18 is brought into an operative position for engagement with the lug or follower arm 46a of the diaphragm adjusting member 46.

The movable stop 13 is constituted as a lever, which is movable about an axis 14 affixed to the control lever 4, and is held in engagement with a positioning pin 16 also affixed to the member 4 by a spring 15. One arm 13a of the lever 13 constitutes an engageable stop or abutment for the exposure setting or diaphragm adjusting member 46, whereas the other arm 13b is provided with a follower pin 17 (affixed to it) which is engageable with a cam 18a provided on the switch or selector member 18. The selector member 18 serves, as already mentioned, as a manually operable exposure setting member. For this purpose, it is provided with a setting mark 19 which is referrable to a diaphragm scale 21 having the word abbreviation "Man" adjoining it. As seen in FIG. 1, the scale 21 may be provided on the member 18 and the index mark 19 disposed on a stationary, crowned portion 1x of the camera case 1. In such case, the selector member 18 also is provided with the abbreviation "Auto" at a location removed from the diaphragm scale 21. The word "Auto" having a reference mark 20, which may be brought opposite the index mark 19 as shown, this indicating the position of the selector member 18 for effecting "automatic" setting of the camera. Considering again FIG. 2, the mark "Auto" may alternatively be located on the camera case 1 at a point remote from the diaphragm scale 21, to designate the automatic position of the selector member 18, as illustrated. That is, the diaphragm scale 21 and the abbreviation "Man" may be provided on the camera case 1 along the path of movement of the selector member 18, according to the showing of FIG. 2.

In the case where exposures are made with benefit of the automatic adjustment, the setting movement of the exposure setting member 46 is controlled as follows: When the selector 18 is placed in the automatic setting as shown in FIGS. 1 and 2, the lever 13 occupies the position indicated wherein its stop arm 13a is located in the path of movement of the diaphragm setting member 46a. With this positioning of the lever 13, the extent of movement or setting of the setting member 46, as it runs down from its fully cocked position, is determined when the follower arm 46a thereof impinges on the arm 13a of the lever. The lever 13 is connected to the exposure meter by means of the members 4, 9 and 5, as will be understood.

If on the other hand, for the purpose of effecting exposures with a non-automatic setting where the diaphragm is adjusted manually, the selector 18 is adjusted so that the index mark 19 thereof is opposite the desired value on the diaphragm scale 21, and this results in the lever 13 being pivoted by the cam 18a against the action of the spring 15 in a counterclockwise direction whereby the stop arm 13a thereof is located out of the path of movement of the follower arm 46a of the exposure setting or diaphragm adjusting member 46. In order to limit the path of movement of the diaphragm adjusting member 46, the stop lever 13, 13a is replaced with the stop 18b which is provided on the selector 18 and which is now engaged by the follower arm 46a as the adjusting member 46 runs down, under the action of the compression spring 64.

The driving device associated with the control member 4 is shown diagrammatically in FIG. 2, and comprises a spiral spring 22 which is at one end affixed to the axis 23 of a gear 24, the other end of the spring being connected to the gear itself. The gear 24 meshes with rack teeth 4b provided on the control member 4.

The cocking of the driving device 22, 23 and 24, as well as the cocking of the spring 64 which is associated with the diaphragm adjusting member 46, is effected simultaneously by means of a cocking member 25 which cooperates with the control member 4 and with the diaphragm adjusting member 46. The cocking member 25 has arms or lugs 25a and 25b which form drivers for the control member 4 and for the diaphragm adjusting member 46 respectively, such drivers being operative unilaterally in the direction of cocking (left-to-right, FIG. 2).

Also, a driving device for the shutter release mechanism (to be described in detail below) is connected with the cocking member 25. The said driving device comprises a driving spring 26 and a gear 28 connected to the spring and positioned about an axis 27, such gear meshing with rack teeth 25c provided on the cocking member 25. As in the camera of my copending application, the film transport device of the camera may be used for cocking the driving device 26, 27 and 28.

The shutter release mechanism which is operable by means of the driving device 26, 27 and 28 comprises a curved cam and locking disc 31 which is positioned about an axis 32 and which is connected to the driving device by means of gears 33 and 34, as well as by additional gear members which are not shown but indicated diagrammatically by the broken line 35. An arresting lever 36 which is cooperable with the cam disc 31 serves to retain the latter, the cocking member 25, the control member 4 and the diaphragm adjusting member 46 all in their positions associated with the cocked state of the associated driving devices, all as illustrated in FIG. 2. The said arresting lever is positioned about an axis 37 affixed to the camera or to the intra-lens shutter construction, such lever being biased in a counter-clockwise direction by a spring 38. When the members 4, 25 and 46 are in the cocked state, a projection 31a provided on the cam disc 31 engages one arm of the lever 36, whereas the other arm is located in the path of movement of the release member 3. The locking and cam disc 31 serves to release a lock for the main drive member of the shutter in a well-known manner, and details of such device are not shown herein. They are revealed in my identified copending application. The disc 31 has a rounded cam portion 31x for this purpose.

In accordance with the present invention, the camera further comprises an interchangeable lens assembly 39 having a built in, adjustable diaphragm. The exposure setting member 46 referred to above is, in such case, the diaphragm setting member of the lens assembly 39, and the spring 64 is carried by such assembly, tending to keep the setting member in a position which corresponds to the smallest diaphragm aperture. The diaphragm setting member 46 having the coupling or follower arm 46a cooperates by means of such arm either with the movable stop lever 13 (for the "Auto" setting of the selector 18) or else with the lug 18b of the manual setting member 18 when the selector is placed in the "Man" setting. The cocking and release member 25 has a path or extent of movement which is correlated to the setting range of the diaphragm adjusting member 46 of the one lens assembly which has the greatest speed (wherein the largest diaphragm aperture may be had). Where interchangeable lens assemblies of lesser speed are used, the diaphragm adjusting member will effect the largest diaphragm aperture prior to reaching the end or limit of its movement, and the difference or overpath of the diaphragm setting member is utilized to maintain the diaphragm in the position corresponding to the largest aperture. By such organization a correlation is effected between the extent of movement of the diaphragm adjusting member and the extent of movement of the cocking and release member 25 which controls the setting of the adjusting member.

The interchangeable lens assembly 39 shown in FIG. 1 has a distance or range setting ring 40 provided with knurled knob 40a, said ring having a range scale 41 which is positionable with respect to an index mark 43 provided on the lens body 42.

In order to clamp the interchangeable lens assembly on the camera, a carrier ring 44 is provided on the intra-lens shutter assemblage 100 in a well-known manner at the front side thereof. The ring 44 has bayonet lugs or tabs 44a with which a bayonet ring 45 of the interchangeable lens assembly cooperates. To mount the lens, the latter is placed on the ring 44 in a position prescribed by markings on the lens and shutter, and is then turned until it reaches a stop or until a well-known securing device (not shown for reasons of clarity of illustration) becomes operative. For this purpose, the lens assembly is provided with a grip ring having a knurled hand grip in the usual well-known manner.

The above described manner of fixing and positioning the interchangeable lens assembly is well known, so that additional details thereof need not be discussed or explained herein.

The markings on the shutter and lens assemblies which prescribe the mounting of the interchangeable lens are so arranged that the coupling and follower arm 46a of the diaphragm setting member 46 is brought into the path of movement of the arm 25b of the cocking member 25 when the lens assembly is mounted in the position corresponding to the cocked position of the cocking member 25 as shown in FIGS. 2 and 3. The extent of turning movement required for clamping the lens assembly corresponds to the entire path of movement of the cocking member 25 which, in turn, is correlated with the setting range of the diaphragm adjusting member of the particular lens assembly having the greatest lens speed (largest diaphragm aperture). Thus, for lens assemblies of lesser speed, the extent of movement of the diaphragm adjusting member will be the same, except that the greatest aperture will be effected prior to the adjusting member reaching the end of its movement, and the overpath or continued movement of the adjusting member will merely retain the diaphragm in the largest setting, providing the largest aperture. Thus, attachment of the interchangeable lens assemblies can be effected, in a camera constructed in accordance with the invention, both for the cocking member 25 being initially in either the cocked or else the non-cocked position.

The lens diaphragm, in the illustrated embodiment of the invention, is constructed in the form of a lamella or segment diaphragm, in a well-known manner. The lamellas or segments (one of which is indicated in FIG. 7 by the letter L) are pivoted about fixed bearing axles and have control pins 46z receivable in cam slots 46b (or 46y) provided on the diaphragm adjusting ring 46 (or 46x). In order to obtain the additional path of movement of the diaphragm setting ring 46x, where the lens has a lesser speed than the greatest speed of a set of lenses, the control slot 46y of the ring 46x, at the end associated with the largest diaphragm aperture, has a portion 46w which is concentric with the axis of the diaphragm adjusting member 46x. When the pin 46z is in the portion 46w of the slot, the diaphragm remains at the largest aperture.

The diaphragm setting ring 46 shown in FIG. 6 has a control slot 46b which is adapted for the lens of greatest speed, associated with a maximum diaphragm opening of 2.8. The diaphragm setting ring 46x in FIG. 7 on the other hand is arranged for use with an interchangeable lens assembly of lesser speed, wherein the maximum diaphragm opening is 5.6. When the ring 46x is being turned counterclockwise it shortly effects the largest diaphragm aperture of 5.6 whereupon the remaining concentric portion 46w of the slot 46y merely maintains the diaphragm at the largest aperture as the ring movement continues to its limit. For an interchangeable lens assembly of greater speed than that represented by the ring 46x of FIG. 7 but of lesser speed than that represented by the ring 46 of FIG. 6, the cam slot would be correspondingly altered whereby the concentric portion would be shorter and the regulating portion would be longer as will now be readily understood.

It is now seen that the respective setting ranges of the different interchangeable lens assemblies are adapted in a surprisingly simple manner to the fixed path of movement of the cocking and releasing member 25 exclusively by properly shaping the control or cam slots of the different diaphragm adjusting rings without involving any additional parts or further costs. The mounting of any one interchangeable lens assembly on the camera case, in accordance with the invention, thus requires no more attention on the part of the operator than the mounting of an ordinary interchangeable lens in cameras of the type well known, wherein the setting devices for the diaphragm are carried entirely by the lens assemblies themselves. In both cases, the attaching of the lens assembly merely requires that it be placed on the camera in a specific relative rotative position as identified by markings, and then turned until a second, marked rotative position has been reached. During this operation, the coupling of the diaphragm which is built into the interchangeable lens assembly with its setting device carried by the camera or shutter assemblage takes place automatically, in accordance with the invention. This surprisingly uncomplicated mode of operation, requiring no additional manipulation, is applicable to all the lens assemblies provided for use with the camera, especially for lens having different speeds.

The selector and manual setting member 18 for the diaphragm, as is apparent from FIGS. 2 and 3, has a path of movement which is correlated with the adjusting movement of the diaphragm adjusting member of that lens assembly which has the greatest lens speed, so that it may be adequate for assemblies of lesser speed. The adaptation of said path of movement of the adjusting member, in lens assemblies of lesser speeds is obtained, in accordance with the invention, by the provision of selectively positioned stops which are provided on the lens assemblies and which have a size or disposition such that, depending on the particular speed characteristics of the lens assemblies that are disposed in the path of movement of the manual setting member 18 at a point which just limits the adjusting range of the latter so as to correspond to the movement required to completely open the diaphragm, in each instance.

This is diagrammatically illustrated by the examples shown in FIGS. 3, 4 and 5. In these figures there is shown the coupling or follower arm 46a, it being understood that such arm is affixed to the diaphragm adjusting ring 46 (or 46x) and is representative of the position of such ring. The lens assembly represented by the showing of FIG. 3 is the fastest, and the diaphragm is capable of an aperture of 2.8. The lens assembly of FIG. 4 is of lesser speed, the diaphragm being capable of an aperture of 4.0, and the lens assembly of FIG. 5 is of still lesser speed with the diaphragm capable of a maximum aperture of 5.6. The respective speeds would be 1:2.8; 1:40; and 1:5.6. For the manual setting of the selector 18, the stop 18b thereof is located in the path of movement of the coupling arm 46a, the latter impinging on such stop during the running down movement of the diaphragm setting ring 46 under the action of the spring 64. The various stops provided on the different lens assemblies for limiting the adjusting path of the selector and manual diaphragm setting member 18, are given the reference numerals 47, 48 and 49 in FIGS. 3, 4 and 5. The size of said stops (or the circumferential disposition of the abutment surface thereof) is such that, when the interchangeable lens assemblies are mounted in position and the setting member 18 adjusted, the latter will be halted by either the stop 47, 48 or 49 (depending on which lens assembly is employed) in a position which corresponds respectively to and effects the largest diaphragm aperture of that particular lens assembly.

The foregoing arrangement insures the condition that only those diaphragm values will be set by means of the manual diaphragm setting member, which are located in the range of the diaphragm of the particular interchangeable assembly utilized, this being effected in a surprisingly uncomplicated and economical manner.

FIG. 8 in conjunction with FIG. 9 shows how it is possible, utilizing a further construction provided by the invention, to obtain a camera which is especially easily understood with respect to its operation and which will insure the taking of successful photographs. This object is attained by the provision of an indicator or warning device which cooperates with the light intensity measuring device of the camera and which preferably is visible in the camera finder, to indicate whether or not a desired exposure setting is within the possible operating range of the camera, considering the prevailing light intensity and taking into account the speed of the particular interchangeable lens assembly which is mounted on the camera. The position of an indicating member of said device with respect to the indicator (and range or path of the same) of the light intensity measuring device can be automatically altered as a consequence of the act of mounting or affixing an interchangeable lens assembly on the camera, this being effected by means of a control device carried by the lens assembly.

The light intensity measuring device, in the illustrated embodiment of the invention, comprises a galvanometer 50 of a well known type, which is located in the circuit of a photoelectric cell 61. The above-mentioned needle 8 is carried by the moving coil 52 of the galvanometer, and cooperates with the sensing member 5, 5a in the manner already described. The needle 8 may be seen in the viewing window 51 which is preferably located in the finder field or is mirrored into the finder in a well known manner.

The indicating device cooperating with the needle 8 is a cover member 53 which is arranged coaxially with the moving coil 52 of the galvanometer and which may be swiveled into the viewing window 51. The adjusting movement of the covering member 53 is adapted to or correlated with the characteristic of the galvanometer 50 by means of a control and transmission device which is provided between the cover member 53 and the interchangeable lens in such a manner that it identifies or indicates, at each setting position, the possible operating range of the camera by restricting the visible range of the needle 8 at the viewing window 51 to a certain size or area.

In order to control or actuate the covering member 53, control members or devices 54 are provided on the interchangeable lens assemblies, such members extending axially or in the direction of the optical axis and having a shape which may be seen in FIG. 9. For the sake of economy, the stops 47, 48 and 49 on the three lens assemblies of different speeds, which are provided for the setting member 18, may be utilized to also constitute the control devices 54 for actuating the cover member 53. The control devices 54 are arranged to have different sizes which are related to the speeds of the lens assemblies. The control device engages, upon the lens assembly being mounted on the camera, one end of a transmission pin 55 which is guided in the housing of the intralens shutter assemblage 100 and is shiftable in a direction parallel to the optical axis. A lever 57 engages the other end of the transmission pin 55 under the action of a spring 56 which biases the lever in a counterclockwise direction. The lever 57 is carried by an axis 58 and has a pin-and-slot connection 57a, 59b with the covering member 53.

In FIG. 8, the members 53, 55 and 57 are shown in solid lines, and different positions thereof are also indicated by broken lines. The solid lines indicate the positions of the members 53, 55 and 57 when a lens of the greatest available speed is used, whereas the broken lines indicate the positions of such members when a lens of lesser speed is used. Whereas the covering member 53 fully exposes the viewing window 51 for use of the needle 18 of the measuring mechanism in the first case (for a lens of the greatest speed) thereby indicating the greatest possible operating range of the camera, the affixing of a lens assemblage of lesser speed, as for example a speed of 1:4.0 or 1:5.6 causes a corresponding reduction or diminution of the effective size of the viewing window 51 by the covering member 53 as a consequence of the control effected by the control member 54 of that particular lens assemblage, acting through the pin 55 and the lever 57.

In order to make allowance for different exposure times and film sensitivities during the automatic setting of the diaphragm, a well-known device for changing the effective sensitivity or response of the light intensity measuring device is also provided on the camera case (see FIG. 1).

A change in the effective sensitivity or response of the light intensity measuring device as a consequence of setting of an exposure time setting ring 59, and setting of a film sensitivity setting ring 60, is obtained by shading the photo-electric cell 61, in front of which there is provided a honeycomb window 62 in a well-known manner.

The shading device comprises two covering members 66 and 67 which are arranged on both sides of the photoelectric cell and are pivotal about axis 63 and 65. To each of the members 66 and 67 links 68 and 69 are pivotally connected. For the purpose of simultaneously adjusting the covering members 66 and 67, the two links are interconnected and are guided by means of a pin 70 and a slot 1a, the latter being provided in the camera case 1.

In order to adjust the above-described shading device in response to adjustment of the setting rings 59 and 60 for exposure time and film sensitivity respectively, a cam 71 is utilized, which is connected to the film sensitivity setting ring 60 (in a manner not shown in the drawing). The ring 60 is, in turn, connected to the exposure time setting ring 59 by means of a releasable coupling device of a well-known type, of which an actuating handle 72 is shown in FIG. 1. The mode of operation of such coupling device is such that, for the uninfluenced state of the same, the exposure time setting ring 59 and the film sensitivity setting ring 60 both move simultaneously or conjointly. However, if the coupling connection between the rings 59 and 60 is released by depressing the handle 72, an adjustment of the ring 60 with respect to the ring 59 can be effected for the purpose of taking into consideration a different film sensitivity. Arranged on the outer circumferences of the rings 59 and 60 are cooperable indicia for the purpose of effecting the proper settings, there being an exposure time scale 73 and a film sensitivity scale 54 on the ring 59, these cooperating with a setting or index mark 76 provided on the shutter front plate 75 and with an index mark 77 arranged on the ring 60 respectively.

The transmission of movement to the shading device 66, 67 from the rings 59 and 60 as effected by the cam 71 which is connected to such rings, is accomplished by means of a pin 78 which is movable in a direction parallel to the optical axis and is guided in the camera casing 1 or the shutter assembly 100 (in a well-known manner not shown in the drawings). One end of the pin 78 engages the cam 71 under the action of a spring 79 which interconnects the two cover members 66 and 67, whereas the other end is cooperable with a pivotal level 81 which is turnable about an axis 80 affixed to the camera case. Thus the connection between the rings 59 and 60 on the one hand and the covering members 66 and 67 on the other hand is established.

The mode of operation and method of using the above described camera is as follows:

(A) *Changing the Lens Assembly*

If the use of another lens assembly, other than the one already mounted on the camera, becomes necessary for photographic or technical reasons, the existing lens assembly on the camera is first removed in a well-known manner, by turning the same. During this operation, the spring 64 located in the lens assembly shifts the diaphragm mechanism, after the coupling or follower arm 46a of the diaphragm setting ring 46 has become disengaged, into an end position which is associated with the smallest diaphragm aperture. The new lens assembly which is to replace that just removed is now placed on the shutter in an orientation predetermined by markings on the lens and shutter assemblages, and is then clamped or affixed by being turned through an angular path which is also determined by markings. In placing the new lens assembly 39 on the shutter assemblage 100 the coupling between the diaphgram adjusting ring 46 and the setting devices of the camera or shutter assemblage is established, by means of the coupling and follower arm 46a of the diaphragm setting ring. In addition, upon mounting of the lens assembly, the control device 54 which operates the indicator 53 within the viewing window 51 of the exposure meter effects an adjustment of the latter automatically in accordance with the speed of the particular lens assembly used. Finally, upon mounting and clamping the new interchangeable lens assembly, the stop 47 (or 48, or 49) of the assembly, which cooperates with the manual setting member 18 becomes operative in the above-described manner and limits the adjusting path or extent of adjusting movement of the manual setting member in accordance with the largest settable diaphragm aperture of the lens assembly, when such manuel setting member is shifted during the effecting of a manual diaphragm adjustment.

(B) *Setting of the Exposure Time*

For this purpose, the exposure time setting ring 59 is turned until the desired exposure time on the scale 73 is disposed opposite the fixed setting or index mark 76.

(C) *Setting for Film Sensitivity*

The film sensitivity is taken into account by adjusting the setting ring 60 after first depressing the actuating handle 72 so as to release the coupling connection between such ring and the exposure time setting ring 59. The setting ring 60 is shifted until the setting mark 77 is opposite the sensitivity value of the film which is to be used, utilizing the scale 74.

For both adjustment of the exposure time and film sensitivity rings, a change is effected in the shading of the photoelectric cell 61 by means of the mechanism comprising the parts 63 and 65 to 70. Hence, a change in the position of the needle 8 of the measuring mechanism which corresponds to the exposure time and film sensitivity values, is had.

(D) *Effecting an Exposure With the Automatic Exposure Setting Mechanism Operative*

As is apparent from FIGS. 1 and 2, the selector member 18 for this purpose is placed in the "Auto" position. For such position, the influence of the cam 18a of the member on the pin 17 of the stop lever 13 is not had, so that the lever 13 occupies its operative position as shown in FIG. 2 under the action of the spring 15. If the device is in the cocked state, as shown in FIG. 2, it is merely necessary to depress the camera release plunger 3 for effecting a photograph or exposure. This movement of the release member 3 is followed by a similar movement of the sensing member 5 under the action of the compression spring 6, whereupon the needle 8 of the measuring mechanism is first clamped in its adjusted position in a well-known manner, by means of the clamping lever 82 (FIG. 2). The sensing member 5 then engages the lever 9 and pivots the same against the action of the spring 11 to a position wherein it is indicative of the existing light conditions, as determined by engagement of one of the steps 5a of the sensing member with the measuring mechanism needle 8. Movement of the sensing member 5 is thus terminated. At the same time, the sensing member impinges at its free or lower end, on the arresting lever 36, causing the same to swing clockwise and pivot, thereby to release the cam disc 31. The disc 31, the cocking member 25, the control member 4 as well as the diaphragm setting or adjusting ring 46 are thereby all released for running down movement, whereby the cam disc 31 now in consequence releases the shutter for opening and closing, this latter being effected in a manner fully explained in my copending application above referred to.

The control member 4, when released for running down movement, engages after a longer or shorter extent of movement the pre-set lever 9 which has been positioned by the setting member 5. Such engagement occurs between the lever 9 and one of the steps 4a of the control member 4. The diaphragm setting ring 46 follows such movement of the control member 4 under the action of the spring 64 and is halted by impingement of the arm 46a thereof with the stop lever 13, 13a of the now halted or fixed control member 4, such member having been halted in a position corresponding to the prevailing light intensity and as determined by the adjusted exposure time and film sensitivity. This terminates the automatic exposure setting and the effecting of an exposure utilizing the same.

(E) *Effecting an Exposure With Non-Automatic Exposure Setting, Wherein the Diaphragm is Manually Adjusted*

This operation merely requires that the selector member 18 be positioned to indicate the desired diaphragm value on the scale 21, utilizing the index mark 19. The stop 47 (or 48 or 49) provided on the lens assembly prevents shifting of the manual setting or selector member 18 to a diaphragm value which does not exist in the range of the particular lens assembly used. Upon setting the member 18 to the proper diaphragm value, the cam 18a comes into engagement with the pin 17 of the stop lever 13, 13a and pivots the latter in a counterclockwise direction so that the stop shoulder 13a moves out of the path of movement of the follower arm 46a, of the diaphragm adjusting ring 46. The lever 13 is accordingly no longer cooperable with the follower arm 46a and instead the latter is free for engagement with the setting stop 18b which is provided on the selector and diaphragm setting member 18. Accordingly, after release of the follower arm 46a by right-to-left shifting movement of the cocking member 25 wherein the arm 25b thereof becomes disengaged from the arm 46a, the latter is free to impinge on the stop 18b under the action of the spring 64, thereby providing the diaphragm aperture for which the member 18 is set.

Variations and modifications may be made within the scope of the claims, and portions of the improvements may be used without others.

I claim:
1. In an automatically settable photographic camera, in combination, a manually operable selector member which is positionable in "Automatic" and "Non-Automatic" positions; a movable control member adapted for connection with a light-intensity measuring device to be adjustably positioned thereby; a stop movably mounted on the control member; power driving means for said control member; a cocking and release device including a movable cocking member having a predetermined path of movement; a removable interchangeable lens assembly having a built-in settable diaphragm and adjusting means therefor including a movable diaphragm adjusting member, and having spring means for shifting and yieldably holding the diaphragm in the position of smallest aperture; a coupling member connected with the diaphragm adjusting member and engageable with either the said stop or the selector member whereby the diaphragm adjusting member may follow movement of either the control member or the selector member under the action of said spring means; means connected with the cocking member and cooperable with said coupling member for shifting the diaphragm adjusting member into a starting position in response to cocking movement of the cocking member through said predetermined path, said diaphragm adjusting means effecting a maximum opening of the diaphragm prior to attainment of said starting position by the adjusting member when shifted by said cocking member and maintaining said maximum opening to the point of said attainment of said starting position.

2. A camera as in claim 1, in which the interchangeable lens assembly has a stop adapted to be disposed in the path of movement of the selector member to limit the movement of the same to a position wherein, when it is engaged with the coupling member, the diaphragm aperture will be at the largest size.

3. A camera as in claim 1, in which the diaphragm comprises lamellas pivoted about fixed axes and having driving pins, in which the diaphragm adjusting member comprises a ring on the lens assembly, and in which the said adjusting means includes a cam on said ring, engageable with a driving pin to actuate a lamella; said cam having a portion concentric with the ring axis to effect said maintenance of the maximum diaphragm opening.

4. A camera as in claim 1, in which there is a casing to which the lens assembly is attachable and a light intensity measuring device carried by the casing and connected to the control member, in which there is an indicator means cooperable with the measuring device and shiftable with respect thereto, and in which there are control means including a control device carried by the lens assembly, for effecting a predetermined setting of the indicator means in response to attachment of the lens assembly to the casing.

5. A camera as in claim 4, in which the interchangeable lens assembly has a stop adapted to be disposed in the path of movement of the selector member to limit the movement of the same to a position wherein, when it is engaged with the coupling member, the diaphragm aperture will be at the largest size, said stop and control device of the control means constituting one and the same member.

References Cited in the file of this patent
UNITED STATES PATENTS

| | | |
|---|---|---|
| 2,929,308 | Swarofsky | Mar. 22, 1960 |
| 3,013,478 | Gebele | Dec. 19, 1961 |
| 3,018,706 | Rentschler | Jan. 30, 1962 |